United States Patent

Schmidt, Jr. et al.

[15] 3,695,451
[45] Oct. 3, 1972

[54] SKIMMING DEVICE

[72] Inventors: Henry Schmidt, Jr., Hinsdale; Richard W. Crain; James F. Zievers, both of La Grange, all of Ill.

[73] Assignee: Industrial Filter & Pump Mfg. Co.

[22] Filed: Jan. 12, 1970

[21] Appl. No.: 2,125

[52] U.S. Cl. ............. 210/526, 210/386, 210/400, 210/DIG. 21
[51] Int. Cl. .................................. E02b 15/04
[58] Field of Search......210/23, 39, 40, 84, 386, 400, 210/523, 526, DIG. 21

[56] References Cited

UNITED STATES PATENTS

| | | |
|---|---|---|
| 1,052,818 | 2/1913 | Helbronner et al......99/218 X |
| 2,798,424 | 7/1957 | Smith et al.............210/386 X |
| 2,860,973 | 11/1938 | Wells...................210/DIG. 21 |
| 3,344,062 | 9/1967 | Kosar..........................210/23 |
| 2,614,102 | 10/1952 | Schlosset et al. ......210/386 X |
| 3,508,663 | 4/1970 | Brill.......................210/400 X |
| 3,314,540 | 4/1967 | Lane.....................210/400 X |

Primary Examiner—John Adee
Attorney—Fidler, Patnaude & Lazo

[57] ABSTRACT

A portable skimmer utilizes a continuous flexible belt which passes through an interface between two liquids to adsorb one of the liquids and then passes between a pair of spring-loaded drive rollers which remove the liquid from the surface of the belt. These rollers are mounted in a collecting trough which directs the removed liquid to a desired location.

4 Claims, 7 Drawing Figures

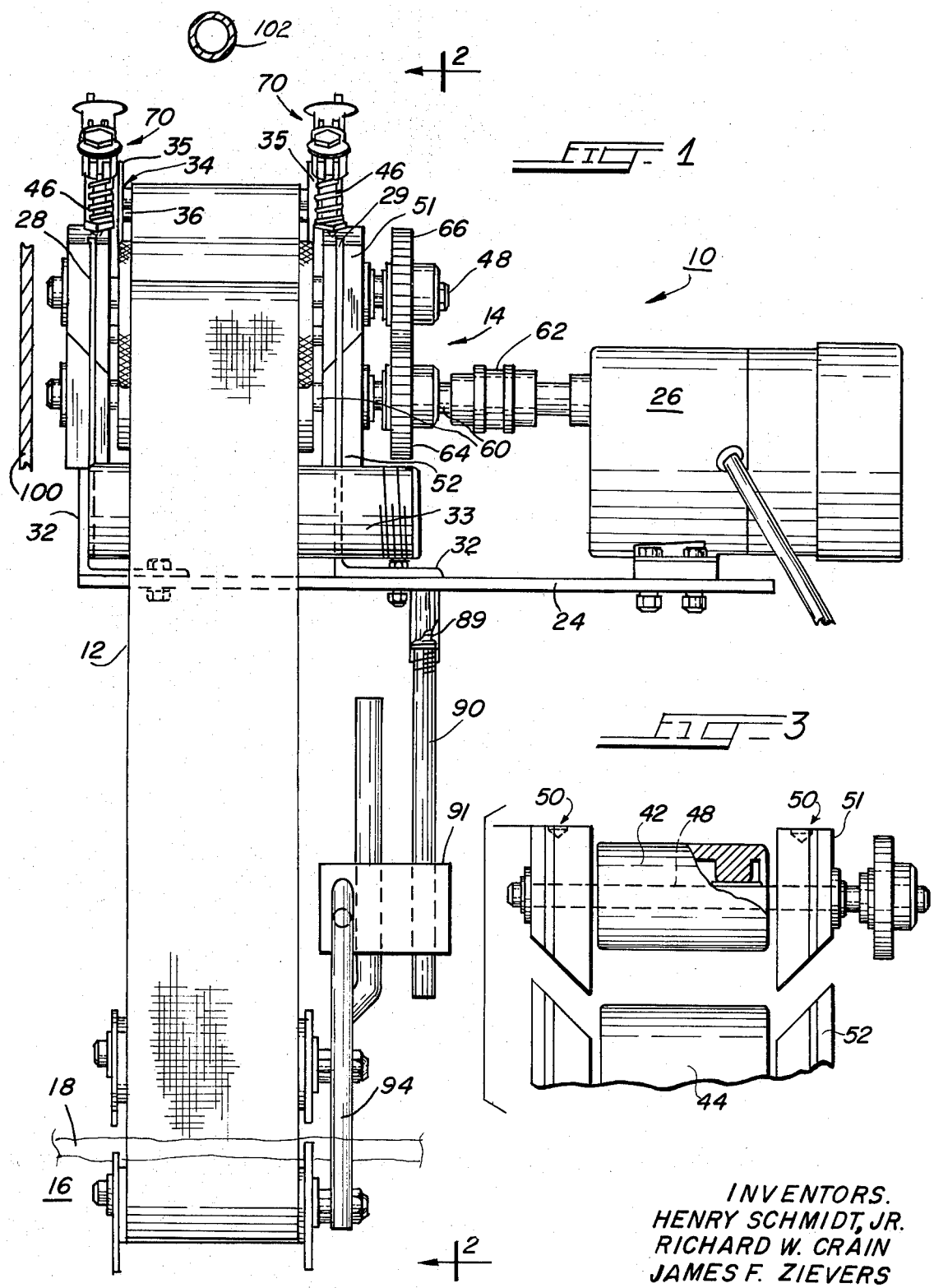

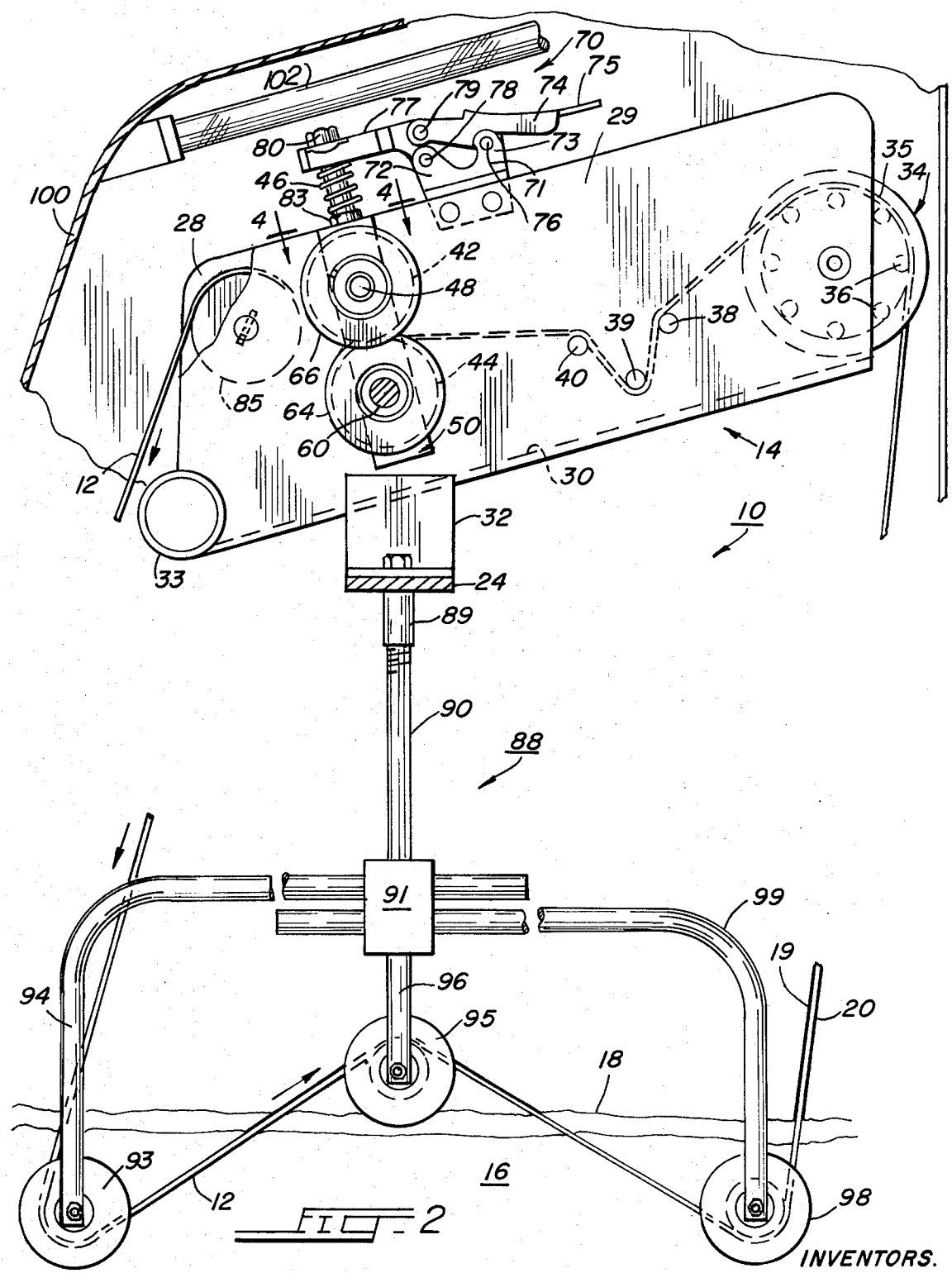

INVENTORS.
HENRY SCHMIDT, JR.
RICHARD W. CRAIN
JAMES F. ZIEVERS

BY Fiedler, Bradley & Patnaude
ATTYS.

SKIMMING DEVICE

The present invention generally relates to a new and improved device for separating a surface liquid from another liquid on which it is floating, and the preferred embodiment as disclosed herein relates more particularly to such a device which employs a continuous, flexible belt formed of a material which is preferentially wettable by one of the liquids.

While the present invention has many and varied uses in separating mutually immiscible liquids, it is described herein in connection with the removal of oil from the surface of a body of water. However, the invention is not so limited and the appended claims should not be so construed.

Although skimming devices have been widely known and used for many years, with the growing need for better control and removal of liquid pollutants from streams, rivers, and other water bodies, it has become increasingly important to provide more efficient and less costly oil skimmers so as to enable a greater and more widespread use of such equipment.

The prior art skimming devices have, in general, utilized a motor driven member such as a drum, a disc, or a belt for gathering up a surface floating liquid and transporting it to a collection area. Such devices have been relatively complex, particularly in the case of the drum and disc types which necessarily included means for adjusting the depth of immersion of the drum or disc in the liquid. Similar depth adjusting means have been used with the belt type skimmers where the belts were passed along the surface of the floating liquid. Because of the complexity of such devices they have been expensive to manufacture and install; they have been difficult and expensive to maintain; and they have left much to be desired in their efficiency of operation.

Therefore, an object of the present invention is to provide a new and improved device for separating one liquid from another.

Another object of this invention is to provide new and improved skimming apparatus which is adaptable for removing oil from the surface of another liquid.

A further object of this invention is to provide a new and improved oil skimmer which is portable, efficient in operation, and relatively inexpensive to manufacture and maintain.

Briefly, the above and further objects may be realized in accordance with the present invention by providing an endless, flexible belt formed of a material preferentially wettable by the liquid to be removed, and drive means for passing the belt at a relatively sharp angle through the interface between the liquids to be separated and between a pair of overhead mounted spring-loaded rollers which squeeze off the liquid carried by the belt so that it falls into an inclined channel which directs it to a collection area.

Further objects and advantages and a better understanding of the present invention may be had by reference to the following detailed description taken in connection with the accompanying drawings, in which:

FIG. 1 is a front elevational view of an oil skimmer embodying the present invention and wherein a portion of the cover has been removed to show the inside of the unit;

FIG. 2 is a cross-sectional view of the device of FIG. 1 taken along the line 2—2 thereof;

FIG. 3 is an exploded view of a portion of the oil skimmer shown in FIG. 1;

Figure 4:
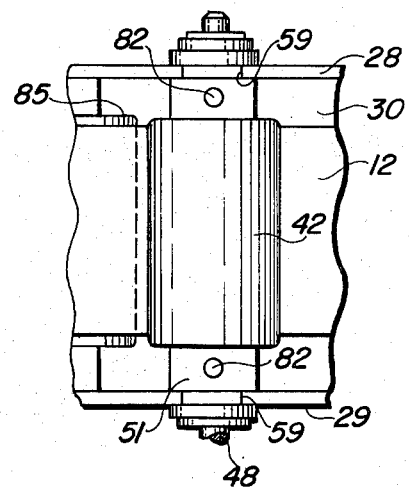
FIG. 4 is a view taken along the line 4—4 of FIG. 2.

Referring now to the drawings, and particularly to FIGS. 1 and 2 thereof, there is shown an oil skimmer 10 including a continuous belt 12 driven by a motor operated drive unit 14 through a liquid 16 on the surface of which another liquid 18 is floating. The belt 12 is formed of a material which is preferentially wettable by the surface liquid 18. When the liquid 18 is oil and the liquid 16 is water, a belt woven of strands of a hydrophobic material such as polyethylene or polypropylene has been found to perform satisfactorily. Consequently, as the belt 12 passes through the liquid layer 18, layers 19 and 20 of that liquid adhere to the opposite faces thereof and are thus carried by the belt 12 into the upper drive unit 14 wherein the liquid 18 is removed from the belt and directed to a collection point.

As best shown in FIG. 2, the belt 12 makes four passes through the interface between the liquids 16 and 18 with the final pass being at substantially right angles to the liquid surface. By making successive passes through the liquid interface the layers 19 and 20 leaving the bath are thicker than is the case where the belt merely passes down through and back up out of the liquid.

Considered in greater detail, the drive unit 14 is mounted on an elongated mounting plate 24 which is adapted to be supported at a suitable distance above the liquid from which the oil or other material is to be skimmed. An electric motor 26 is suitably mounted by conventional means on the plate 24. A channel-shaped trough is formed by a pair of upstanding sidewalls 28 and 29 which are interconnected by an integral web or bottom portion 30. This trough is mounted on the plate 24 by means of a pair of angle brackets 32 which are bolted to the plate 24 and suitably secured as by welding to the trough sides 28 and 29, respectively. It will be seen from FIG. 2 that the trough bottom or web portion 30 is inclined in the direction of belt travel at an angle of approximately 25° from the horizontal so that oil which falls thereon flows under the force of gravity downwardly toward the left as viewed in FIG. 2.

Figure 6:
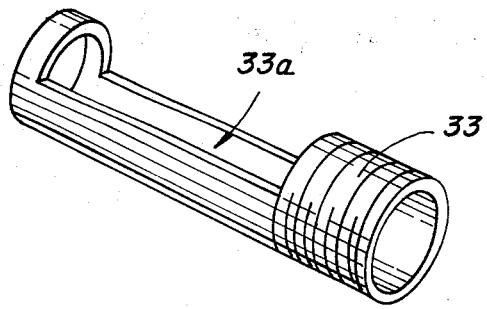
FIG. 6 is a perspective view of the split nipple drain used in the device of FIG. 1.

At the lower end of the trough, a split nipple 33 is mounted by welding the same to the sidewalls 28 and 29 and the bottom 30. As best shown in FIG. 6, the nipple 33 has an elongated aperture 33a cut in the side thereof and the left end of the nipple is plugged so that the liquid which flows down the trough exits through the nipple 33 toward the right as viewed in FIG. 1. A hose or the like may be connected to the threaded end of the nipple to carry the liquid to the desired location.

An inlet roller 34 is suitably journaled in the walls 28 and 29 for free rotation at the upper right-hand end of the trough and consists of a pair of circular end discs 35 connected together by a plurality of cylindrical rods 36 over which the belt 12 rides. The rods 36 provide a minimum contact area between the roller 34 and the belt 12 to minimize liquid flow back down the belt. As viewed in FIG. 2, it will be seen that a portion of the inlet roller 34 extends outwardly beyond the end of the trough to provide clearance between the belt and the web portion 30.

After passing over the roller 34, the belt 12 passes through a belt tensioning device consisting of three cylindrical rods 38, 39 and 40 which are mounted by the trough walls 28 and 29 and extend completely across the trough. The rods 38 and 40 are fixed in place and the rod 39 is slidably removable from the trough, thereby to facilitate removal of the belt as described more fully hereinafter.

After passing over the rod 40, the belt passes between a pair of liquid removal drive rollers 42 and 44 which are resiliently biased into engagement with the belt 12 by means of a coil spring 46. The rollers 42 and 44 may be identical in construction and as best shown in FIG. 3, the roller 42 is a hollow, metal cylinder keyed to a shaft 48. The rollers 42 and 44 may be made of carbon steel and should have a smooth outer surface.

Figure 5:
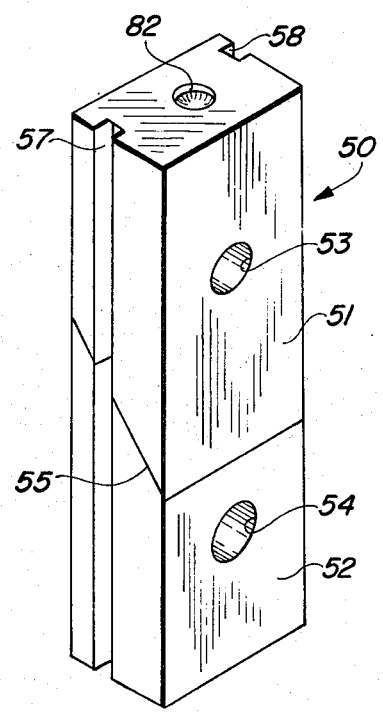
FIG. 5 is a perspective view of one of the bearing assemblies used in the device of FIG. 1.

In order to mount the rollers 42 and 44 so that they may be driven in unison while spring-loaded against the belt 12 which passes therebetween, a pair of bearing assemblies 50, one of which is best shown in FIG. 5, are respectively mounted by the trough walls 28 and 29. Each bearing assembly 50 includes an upper bearing block 51 and a lower bearing block 52. These blocks may be formed of a suitable plastic, such as a phenolic, and are provided respectively with bearing apertures 53 and 54 through which the shafts of the rollers 42 and 44 extend. The bearing block 51 has an inclined lower surface which mates with a complementary tapered upper surface on the lower block 52. These inclined surfaces are adapted to meet along the plane 55, but with the belt 12 in place, these blocks are slightly spaced apart.

The inclined adjoining surfaces of these bearing blocks extend in a downward direction so that the liquid which is carried into the drive unit by the belt 12 does not leak out of the unit through the space between these blocks.

Referring again to FIG. 2, the bearing block assemblies 50 are mounted in the vertical walls 28 and 29, respectively, of the trough as best shown in FIG. 4, and for this purpose each of the assemblies includes a pair of slots 57 and 58 having a width approximately equal to but no less than the thickness of the trough sides 28 and 29. The trough sides 28 and 29 are provided with rectangular slots 59 which open from the top thereof and into which the bearing block assemblies may be slidably dropped into the operating positions as shown in FIG. 2.

The lower drive roller 44 includes a shaft 60 which is journaled in the apertures 54 in the lower bearing blocks 52 and which is connected to the drive shaft of the motor 26 by means of a standard coupling 62. Hence, as the shaft of the motor 26 rotates, the lower roller 44 is rotated.

In order to drive the upper roller 42 in unison with the lower roller 44, a spur gear 64 is mounted on the shaft 60 and a spur gear 66 mates with the gear 64 and is keyed onto the shaft 48. The gears 64 and 66 are identical and have a pitch diameter equal to the outside diameters of the rollers 42 and 44.

In order to resiliently urge the upper bearing blocks 51 downwardly, thereby to urge the upper roller 42 into engagement with the belt 12 disposed between the rollers 42 and 44 and at the same time permit adjustment of this resilient biasing force while enabling ready removal of the belt 12 and the drive assembly for cleaning and other maintenance, the coil springs 46 are each included in a toggle assembly 70. These toggle assemblies 70 are respectively mounted on and secured to the trough walls 28 and 29 by riveting or other suitable means. As best shown in FIG. 2, the toggle assemblies 70 each include a mounting bracket 71 having two pairs of spaced-apart upstanding lugs 72 and 73. A first toggle arm 74 having a finger-gripping end portion 75 is pivotally mounted to the lug 73 by a pintle 76 and a second toggle member 77 is pivotally mounted to the lug 72 by a pintle 78 and to the toggle member 74 by means of a pintle 79. The leftward end portion of the toggle member 77 is apertured to receive a bolt 80 which extends therethrough with the lower end of the bolt 80 resting loosely in a blind hole 82 (FIG. 5) provided in the top of the associated one of the upper bearing blocks 51. An adjusting nut 83 is threaded onto the lower end of the bolt 80 and the spring 46 is positioned between this nut 83 and the lower face of the toggle member 77. It may thus be seen that with the toggle in the closed position as illustrated in FIG. 2, a force is exerted through the spring 46 to hold the associated bearing blocks in place and to force the roller 42 downwardly thereby to compress the belt 12 between the rollers 42 and 44.

After the belt 12 leaves the drive and squeeze rollers 42 and 44, it passes over an outlet roller 85, which may have a roughened surface to minimize belt slippage and wear and which is journaled for free rotation in the trough walls 28 and 29.

After leaving the upper drive unit, the belt passes downwardly into the liquid from which the upper layer is to be removed and its path of travel through such liquid is controlled by a lower unit 88. The unit 88 may be mounted separately from the upper drive unit or, as is illustrated in FIGS. 1 and 2, it may depend from the mounting plate 24. As illustrated, an internally threaded coupler 89 is welded to the bottom of the plate 24 and a mounting pipe 90 is threaded into the coupler 89 and slidably extends through a suitable vertical opening in a mounting block 91. A set screw (not shown) is used to secure the mounting block 91 at a desired position along the pipe 90 thereby to adjust the position of the belt in the liquid. A first guide roller 93 is mounted for free rotation on an arm 94 which includes a right-angle bend and slidably extends through a suitable hole in the mounting block 91 where it is held at an adjusted position therein by means of a set screw (not shown). Another guide roller 95 is mounted for free rotation on a straight rod 96 which is also adjustably mounted in a similar manner in the mounting block 91, and a third guide roller 98 is mounted on an arm 99 which includes a right-angle bend and is adjustably mounted in a similar manner in the block 91. Accordingly, it may be seen that the guide rollers 93, 95 and 99 may be adjusted relative to one another and the entire assembly is vertically adjustable along the pipe 90. In the illustrated and preferred position, the intermediate roller 95 is above the surface of the liquid and the end rollers 93 and 98 are disposed below the interface between the liquids 16 and 18 whereby the belt 12 makes four passes through the interface between the liquids 16 and 18 before passing upwardly into the upper drive unit 14.

Figure 7:
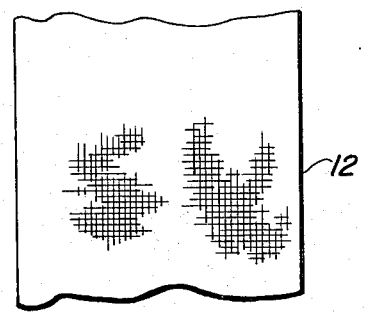
FIG. 7 is a view of the face of the belt used in the device of FIG. 1.

Referring to FIG. 7, it may be seen that the belt 12 is a woven fabric having a woven surface finish which provides better liquid adsorption than does a smooth finish. In a reduction to practice of this invention, a belt having a width of 3 inches and woven from monofilaments of polypropylene to a No. 7 harness satin weave was used satisfactorily. The drive unit was mounted about 24 inches above the liquid surface and the belt was driven at a velocity of 47 feet/min. which resulted in a rate of emulsified No. 20 motor oil removal of 3090 gms/sec or 92 gms/square inch of belt area with an insignificant amount of water pickup.

In those applications wherein the liquid separator 10 is used in food processing systems it may be desirable to sterilize the liquid 18 as it passes through the upper unit 14. For this purpose, a cover 100 is removably mounted over the trough, and a source of ultraviolet radiation 102 is mounted in the cover directly over the trough. The source 102 is an elongated tube suitably energized from the same electric source which powers the drive motor 26 and extends over the full length of the trough. The liquid 18 which is carried into the upper unit 14 is thus irradiated with the ultraviolet rays emitted by the source 102 to minimize bacteria growth therein.

What is claimed is:

1. Skimming apparatus for removing a top immiscible liquid layer from a bottom liquid on which it floats, comprising
   an endless belt formed of a material preferentially wettable by said top liquid,
   a channel shaped trough having a pair of sidewalls and an inclined bottom wall.
   drive means including a driven roller and a second roller journaled in said sidewalls,
   said belt extending through said trough and being disposed between said rollers,
   releasable spring means carried by said trough for urging said rollers toward one another against said belt whereby liquid carried by said belt is removed therefrom by said rollers, and
   belt guide means mounted to said trough for guiding said belt through the interface between said liquids.

2. Skimming apparatus for removing a top immiscible liquid layer from a bottom liquid on which it floats, comprising
   a channel-shaped trough open at opposite ends and formed by a pair of upstanding sidewalls and a bottom interconnected between said sidewalls,
   said bottom of said trough being inclined at a substantial angle relative to the horizontal plane,
   an inlet roller journaled in said sidewalls and disposed in said trough with a portion of said roller overhanging the upper end of said bottom,
   first and second liquid removal drive rollers,
   first and second bearing block assemblies removably mounted respectively in said sidewalls,
   each of said bearing block assemblies including a pair of bearing blocks mounted one on top of the other,
   said drive rollers being respectively journaled between said assemblies in corresponding ones of said bearing blocks,
   latch means carried by said trough for latching said bearing block assemblies in said sidewalls,
   spring means interconnected between said latch means and the upper ones of said bearing blocks for resiliently urging said drive rollers together,
   tensioning means mounted in said trough by said sidewalls intermediate said inlet roller and said drive rollers,
   an endless flexible belt having a portion extending over said inlet roller, through said tensioning means and between said drive rollers and a portion hanging a substantial distance below said trough for disposition in said liquids,
   motor means mounted to said trough and drivingly connected to both said drive rollers for driving said rollers in opposite directions at equal speeds,
   a lower belt guide unit mounted to said trough for vertical adjustment relative thereto and including a pair of guide rollers under which said belt extends for guiding said belt through the interface between said liquid layers, and means for adjusting the horizontal spacing between said guide rollers.

3. Skimming apparatus according to claim 2 wherein said lower belt guide unit comprises
   another guide roller mounted intermediate said pair of guide rollers, and
   means for adjusting the height of said another guide roller relative to said pair of rollers,
   said belt extending under said pair of guide rollers and over said another guide roller.

4. Skimming apparatus according to claim 2 wherein said bearing blocks are slidably mounted in slots in said sidewalls,
   the bottom ones of said blocks having an upper surface inclined downwardly toward the center of said trough, and
   the upper ones of said blocks having a lower surface inclined downwardly toward the center of said trough.

* * * * *